United States Patent
Wu et al.

(10) Patent No.: US 7,567,749 B2
(45) Date of Patent: Jul. 28, 2009

(54) MOTOR CONTROL CIRCUIT

(75) Inventors: Chia-feng Wu, Taoyuan County (TW); Ching-sen Hsieh, Taoyuan County (TW); Yueh-lung Huang, Taoyuan County (TW); Ming-shi Tsai, Taoyuan County (TW)

(73) Assignee: Delta Electronics, Inc., Taoyuan County (TW)

( * ) Notice: Subject to any disclaimer, the term of this patent is extended or adjusted under 35 U.S.C. 154(b) by 244 days.

(21) Appl. No.: 11/703,183

(22) Filed: Feb. 7, 2007

(65) Prior Publication Data

US 2007/0160354 A1   Jul. 12, 2007

Related U.S. Application Data

(63) Continuation of application No. 10/895,902, filed on Jul. 22, 2004, now Pat. No. 7,242,857.

(30) Foreign Application Priority Data

Nov. 19, 2003   (TW) ............................ 92132441 A

(51) Int. Cl.
   *H02P 7/29*   (2006.01)
(52) U.S. Cl. .................... 388/831; 318/254.1; 318/599; 318/811
(58) Field of Classification Search ................. 318/138, 318/254, 439, 599, 800–813; 388/831, 809, 388/811
   See application file for complete search history.

(56) References Cited

U.S. PATENT DOCUMENTS

| | | | |
|---|---|---|---|
| 3,597,638 A | 8/1971 | Jensen et al. | |
| 3,767,988 A | 10/1973 | Jensen et al. | |
| 4,366,399 A | 12/1982 | Furuhata et al. | |
| 4,441,068 A | 4/1984 | Smith | |
| 4,802,077 A | 1/1989 | Fujii et al. | |
| 4,897,778 A | 1/1990 | Miyamoto et al. | |
| 5,099,408 A | 3/1992 | Chen et al. | |
| 5,457,766 A | 10/1995 | Ko | |
| 5,625,269 A * | 4/1997 | Ikeda | 318/696 |
| 5,627,441 A | 5/1997 | Sakurai et al. | |
| 5,977,741 A | 11/1999 | DeLange et al. | |
| 6,065,231 A | 5/2000 | Suzuki et al. | |
| 6,088,246 A | 7/2000 | Okuyama et al. | |
| 6,222,690 B1 | 4/2001 | Tanaka et al. | |
| 6,285,146 B1 | 9/2001 | Harlan | |
| 6,381,406 B1 | 4/2002 | Smith et al. | |
| 6,385,395 B1 | 5/2002 | Horng et al. | |

(Continued)

FOREIGN PATENT DOCUMENTS

JP   2001-054298   2/2001

*Primary Examiner*—Bentsu Ro
*Assistant Examiner*—Thai Dinh
(74) *Attorney, Agent, or Firm*—Muncy, Geissler, Olds & Lowe, PLLC

(57) ABSTRACT

A motor control circuit includes a pulse width modulation (PWM) signal generating circuit, a driving circuit and a waveform-shaping circuit connected between the PWM signal generating circuit and the driving circuit. The PWM signal generating circuit generates a square wave with a sequence of alternating on-time and off-time. The waveform-shaping circuit adjusts the rise-time and the fall-time of the square wave to be both within a range of 5% to 15% of the square wave period, and the driving circuit outputs a driving signal to a fan motor according to the adjusted square wave.

13 Claims, 6 Drawing Sheets

U.S. PATENT DOCUMENTS

| | | |
|---|---|---|
| 6,563,284 B2 | 5/2003 | Teutsch et al. |
| 6,650,074 B1 | 11/2003 | Vyssotski et al. |
| 6,690,135 B2 | 2/2004 | Mir et al. |
| 6,700,339 B2 | 3/2004 | Vyssotski et al. |
| 6,704,212 B2 | 3/2004 | Furukawa et al. |
| 6,714,424 B2 | 3/2004 | Deng et al. |
| 6,775,158 B2 | 8/2004 | Fu |
| 6,806,673 B2 | 10/2004 | Ho et al. |
| 6,815,916 B2 | 11/2004 | Horng et al. |
| 6,891,342 B2 | 5/2005 | Nakamura et al. |
| 6,946,808 B2 * | 9/2005 | Kandori ................ 318/400.33 |
| 7,218,846 B2 * | 5/2007 | Wu et al. ................ 318/400.14 |
| 2002/0060544 A1 | 5/2002 | Teutsch et al. |
| 2002/0180518 A1 | 12/2002 | Midya et al. |
| 2003/0117820 A1 | 6/2003 | Milazzotto et al. |
| 2003/0198464 A1 | 10/2003 | Horng et al. |
| 2003/0222608 A1 | 12/2003 | Vyssotski et al. |
| 2004/0027105 A1 | 2/2004 | Nakamura et al. |
| 2004/0179830 A1 | 9/2004 | Sunaga et al. |
| 2005/0040778 A1 | 2/2005 | Lin et al. |
| 2005/0218844 A1 | 10/2005 | Ichimaru et al. |
| 2005/0285582 A1 | 12/2005 | Azuma et al. |

* cited by examiner

MOTOR CONTROL CIRCUIT

CROSS-REFERENCE TO RELATED APPLICATION

This application is a continuation of U.S. application Ser. No. 10/895,902, filed Jul. 22, 2004, now U.S. Pat. No. 7,242,857, and claims the priority benefit of Taiwan Patent Application No. 092132441 filed on Nov. 19, 2003, hereby incorporated by reference herein in its entirety.

BACKGROUND OF THE INVENTION (a) Field of the Invention

The invention relates to a motor control circuit and, more particularly, to a motor control circuit capable of diminishing back electro-motive force (emf) to reduce switching noise.

(b) Description of the Related Art

FIG. 1 is a schematic diagram illustrating a conventional bridge circuit, which includes a first drive unit having an opposite pair of transistors Q1 and Q4 and a second drive unit having an opposite pair of transistors Q2 and Q3. As a pulse width modulation (PWM) signal generating unit (not shown) generates a square wave shown in FIG. 2, it is first fed to the bridge circuit to make the first drive unit enabled, allowing current to flow through the motor coil 10 in the direction plotted in solid line, as shown in FIG. 3. Then, the phase angle of the input square wave is changed to make the second drive unit enabled and the first drive unit disabled, allowing the current to flow through the motor coil 10 in another direction as plotted in dash line. By determining which pair of transistors is enabled, the current can be made to flow in either of the two directions through the motor. Because permanent-magnet motors reverse their direction of turn when the current flow is reversed, this bridge circuit allows bi-directional control of the motor.

However, in conventional PWM control as illustrated in FIG. 2, since the switching time from "On time" period to "Off time" period (pulse level H to 0), or from "Off time to "On time" (pulse level 0 to H), is very short, such abrupt change in pulse level may result in a considerable back electro-motive force that highly influences the operating voltage and current in a fan motor, as shown in FIG. 4, and the switching noise of the driving circuit is greatly increased as a result.

BRIEF SUMMARY OF THE INVENTION

An object of the invention is to provide a motor control circuit that can effectively diminish back electro-motive force (emf) to reduce switching noise.

According to the design of the invention, a motor control circuit includes a pulse width modulation (PWM) signal generating circuit, a driving circuit and a waveform-shaping circuit connected between the PWM signal generating circuit and the driving circuit. The PWM signal generating circuit generates a square wave with a sequence of alternating on-time and off-time. The waveform-shaping circuit adjusts the rise-time and the fall-time of the square wave to be both within a range of 5% to 15% of the square wave period, and the driving circuit outputs a driving signal to a fan motor according to the adjusted square wave.

Through the design of the invention, since the square wave is modified by the waveform-shaping circuit to have a lengthened rise time and fall time, the abrupt change in pulse level is eliminated and thus the back emf induced in a motor coil is diminished, and the switching noise of the motor control circuit is greatly reduced as a result.

DETAILED DESCRIPTION OF THE INVENTION

Figure 1:
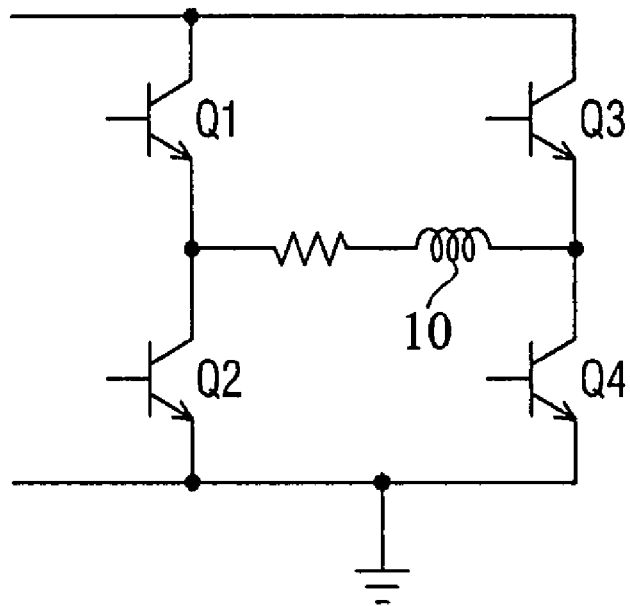
FIG. 1 is a schematic diagram illustrating a conventional bridge driving circuit.
Figure 2:
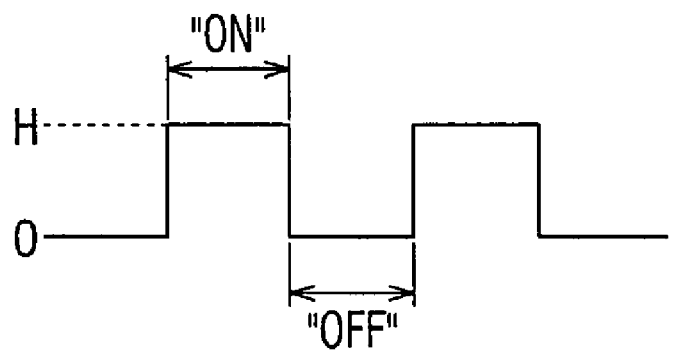
FIG. 2 is a schematic diagram illustrating the square wave of a PWM signal.
Figure 3:
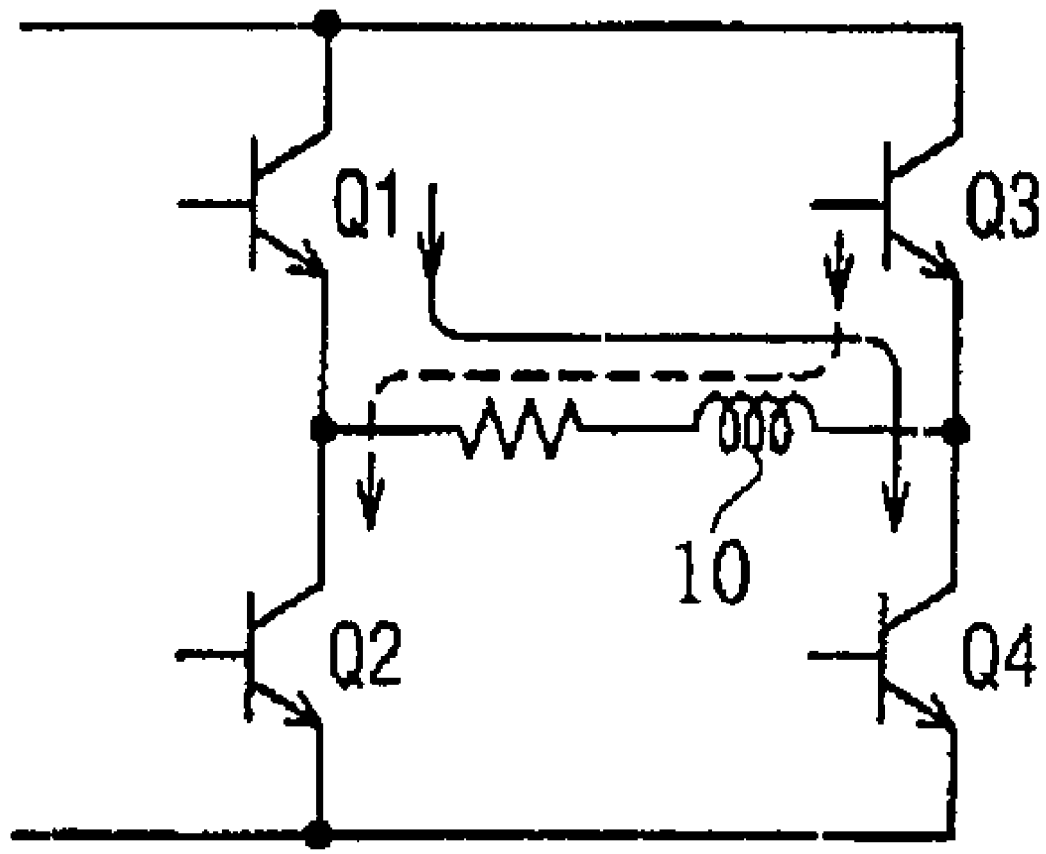
FIG. 3 illustrates the current paths of two alternately conducted drive units.
Figure 4:
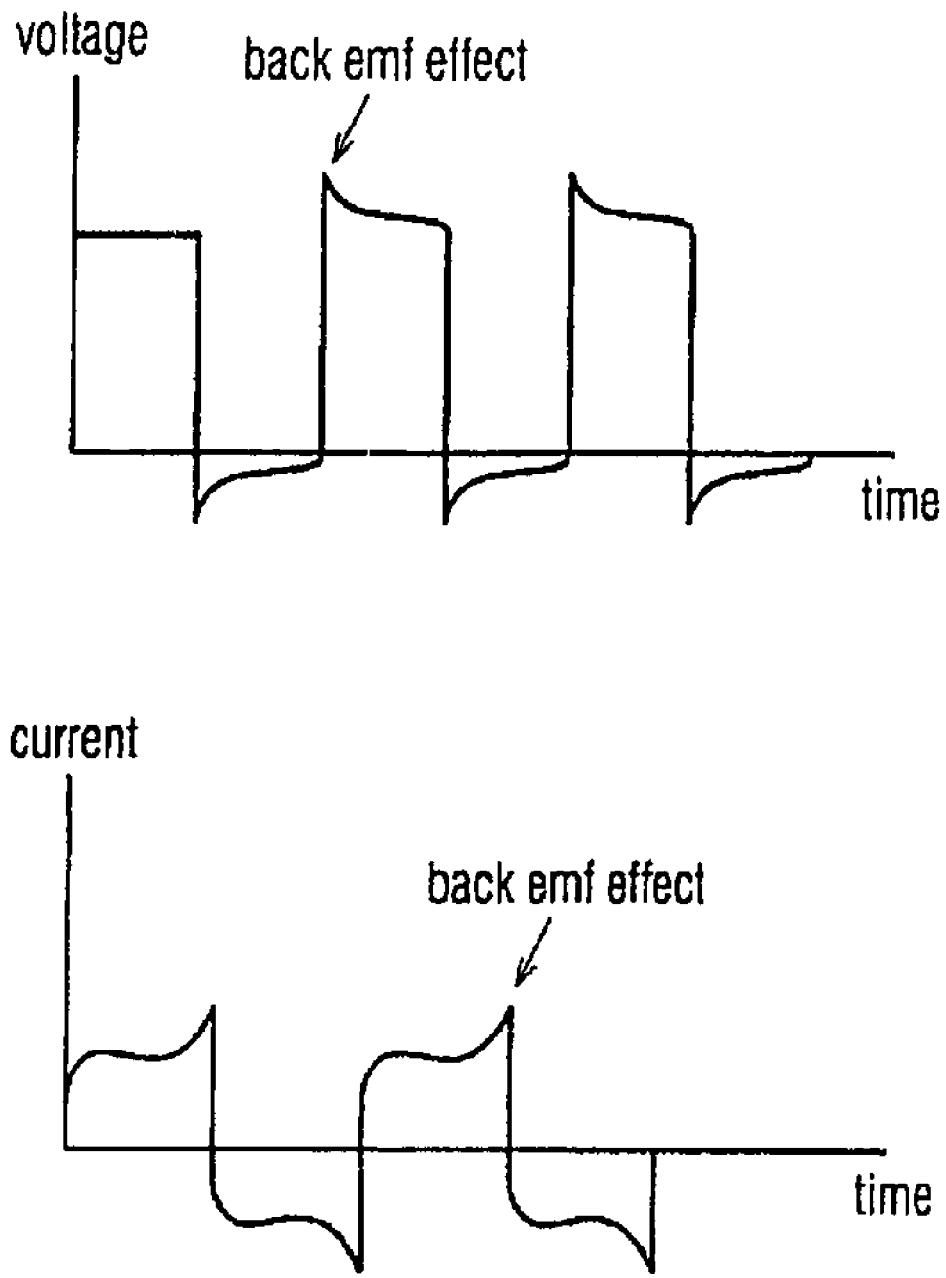
FIG. 4 illustrates the back emf effect exerted on the operating voltage and current in a fan motor.
Figure 5:
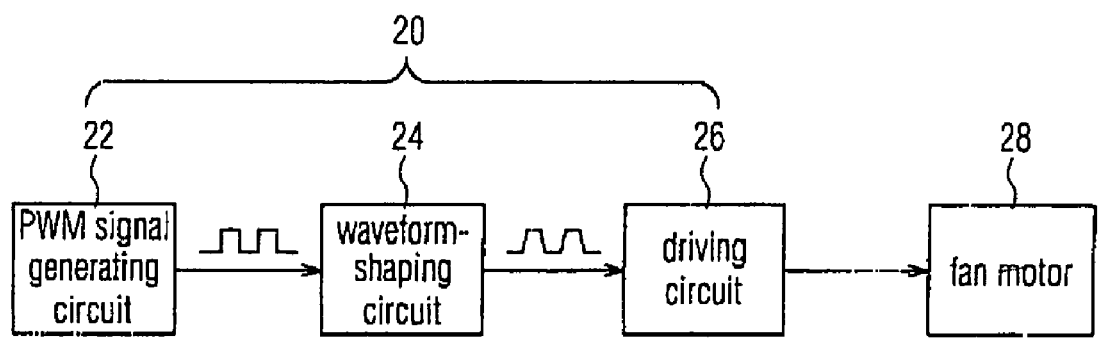
FIG. 5 is a block diagram illustrating a motor control circuit according to the invention.

Referring to FIG. 5, a motor control circuit 20 according to the invention includes a pulse width modulation (PWM) signal generating circuit 22, a driving circuit 26, and a waveform-shaping circuit 24 connected between the PWM signal generating circuit 22 and the driving circuit 26. The PWM signal generating circuit 22 generates a square wave with a sequence of alternating on-time and off-time, and the driving circuit 26 feeds a driving signal to a fan motor 28 according to the square wave.

In conventional PWM control, the switching time from "On time" period to "Off time" period, or from "Off time to "On time", is very short to result in an abrupt change in pulse level, and this may result in a considerable back electromotive force (emf). To solve this problem, according to the invention, a waveform-shaping circuit 24 is arranged between the PWM signal generating circuit 22 and the driving circuit 26 to lengthen the rise-time and the fall-time of the square wave.

Figure 6:
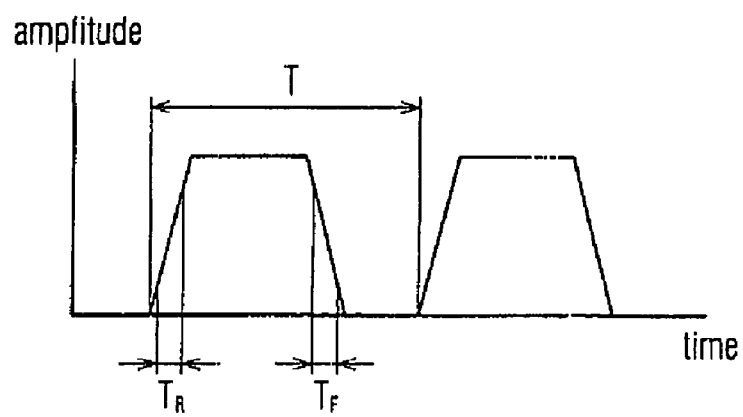
FIG. 6 illustrates an output waveform modified by the waveform-shaping circuit according to the invention.

Referring to FIG. 6, according to the invention, the rise-time $T_R$ and the fall-time $T_F$ are set both in a predetermined range approximately from 5% to 15% of the square wave period T, where $T_R$ is the time required for the pulse level to rise from 10% (−20 dB) to 90% (−0.9 dB) of the amplitude, and $T_F$ is the time required for the pulse level to fall from 90% (−0.9 dB) to 10% (−20 dB) of the amplitude.

Accordingly, since the square wave, modified by the waveform-shaping circuit, is transformed into a trapezoidal wave with lengthened rise time TR and fall time TF, the abrupt change in pulse level is eliminated and thus the back emf induced in a motor coil is diminished when the driving circuit feeds a driving signal according to the trapezoidal wave.

Therefore, the switching noise of the motor control circuit is greatly reduced, especially in the event that the fan motor operates at a low speed.

Figure 7:
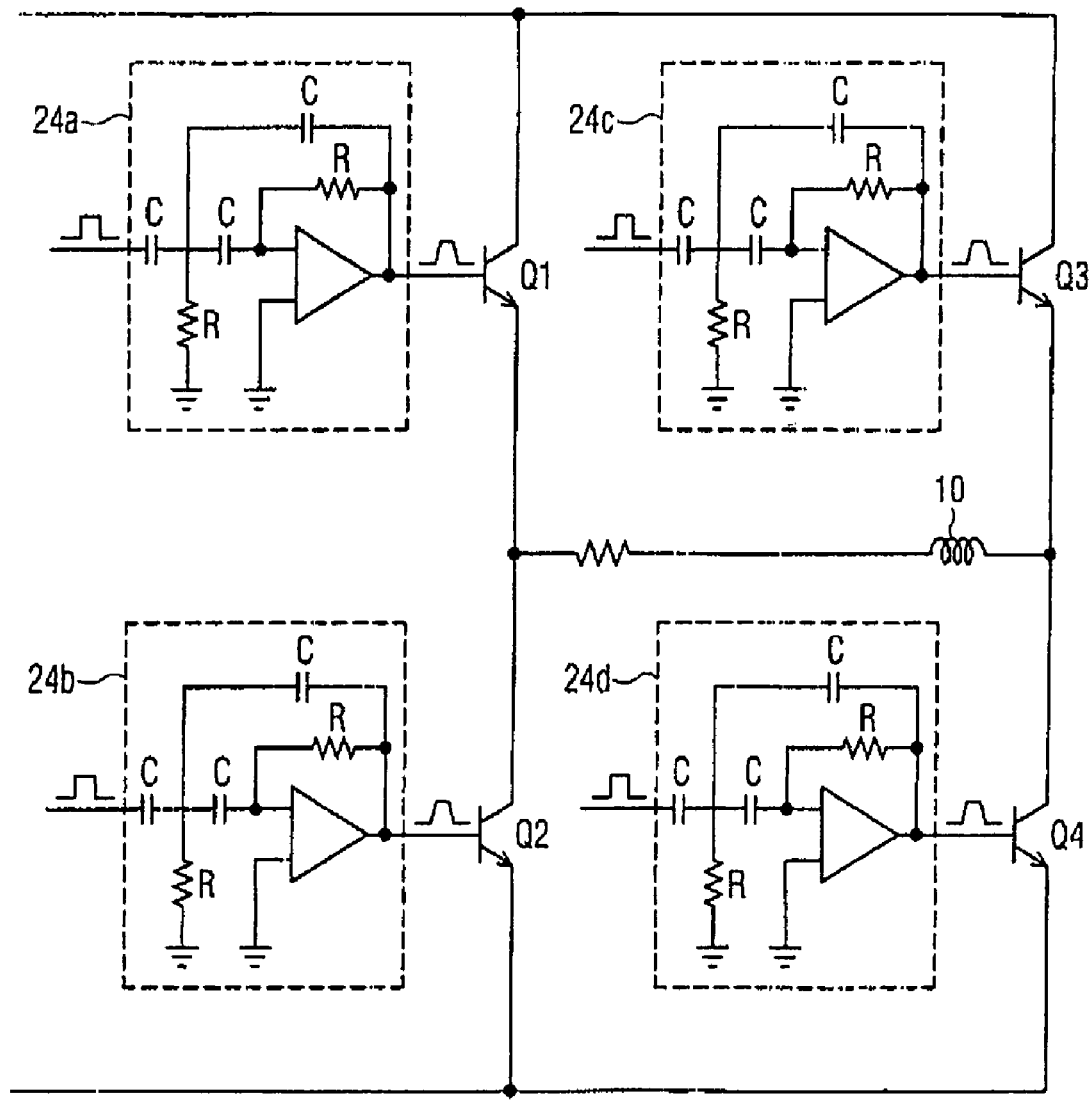
FIG. 7 illustrates an assembly embodiment of the waveform-shaping circuit and the driving circuit according to the invention.

FIG. 7 illustrates an embodiment of the assembly of the waveform-shaping circuit 24 and the driving circuit 26. Referring to FIG. 7, the driving circuit 26 includes a first drive unit having an opposite pair of transistors Q1 and Q4 and a second drive unit having an opposite pair of transistors Q2 and Q3, and the two drive units are alternately conducted by the trapezoidal wave. The waveform-shaping circuit 24 includes a plurality of waveform-shaping units 24a, 24b, 24c and 24d, which are separately connected to transistors Q1, Q2, Q3 and Q4, respectively, such that the rise time $T_R$ and fall time $T_F$ of the trapezoidal wave are both limited in the range approximately from 5% to 15% of the trapezoidal wave period T. Furthermore, the waveform-shaping circuit 24 includes an operational amplifier, resistors and capacitors for transforming the square wave into the trapezoidal wave. One of the resistors is connected with the ground and the other of the resistor is electrically connected with the operational amplifier in parallel. The capacitors are electrically connected with the resistor and the operational amplifier in series and in parallel, respectively. The resistors have first ends electrically connected to the driving circuit and second ends electrically connected to the capacitors in parallel, respectively.

The transistors may be bipolar transistors, and the waveform-shaping unit may be a phase delay circuit having operational amplifiers, resistors and capacitors, such that the rise time $T_R$ and fall time $T_F$ can be limited in a range from 5% to 15% of the trapezoidal wave period T by varying the resistance and the time constant.

Figure 8:
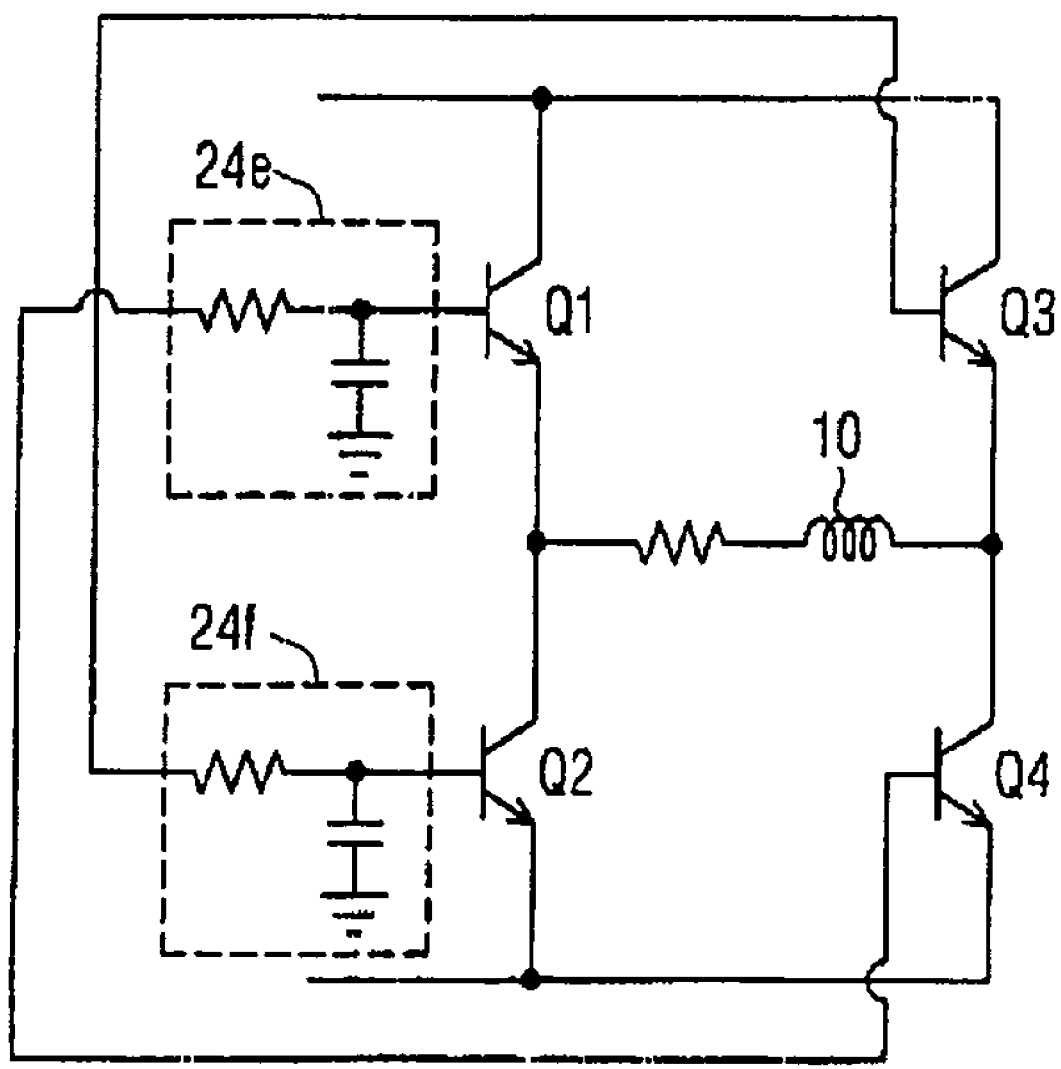
FIG. 8 illustrates another assembly embodiment of the waveform-shaping circuit and the driving circuit according to the invention.

The waveform-shaping circuit 24 is only for modifying the waveform of the square wave generated from the PWM signal generating circuit 22, and thus its configuration is not limited to aforesaid embodiments. Referring to FIG. 8, the waveform-shaping circuit may have only two waveform-shaping units 24e and 24f, each of which is connected to the first and the second drive units, respectively. Also, the waveform-shaping units 24e and 24f may be in a simple form consisting of only resistors and capacitors, which can provide the same function of waveform control as recited above. The waveform-shaping circuit includes a resistor and a capacitor. The resistor is connected to the capacitor and one of the transistors. The capacitor is electrically connected with the ground.

Further, the driving circuit 26 may be incorporated in a driver IC, and, in that case, the function of waveform control that achieved by the waveform-shaping circuit may be also incorporated in the driver IC.

While the invention has been described by way of examples and in terms of the preferred embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A motor control circuit, comprising:
a pulse width modulation (PWM) signal generating circuit for generating a square wave with a sequence of alternating on-time and off-time;
a driving circuit having a plurality of transistors; and
a waveform-shaping circuit, connected between the PWM signal generating circuit and the driving circuit, wherein the waveform-shaping circuit has a plurality of waveform-shaping units respectively connected to the transistors for adjusting both the rise-time and the fall-time of the square wave to be within a predetermined range of the square wave period;
wherein the driving circuit outputs a driving signal to a fan motor according to the adjusted square wave;
wherein the waveform-shaping circuit includes an operational amplifier, and a plurality of resistors and capacitors, one of the resistors being connected to ground, another of the resistors being electrically connected with the operational amplifier in parallel, and the capacitors being electrically connected with the resistor and the operational amplifier in series and in parallel, respectively.

2. The motor control circuit as recited in claim 1, wherein the predetermined range is from 5% to 15% of the square wave period.

3. The motor control circuit as recited in claim 1, wherein the waveform-shaping circuit is a phase delay circuit.

4. The motor control circuit as recited in claim 1, wherein the driving circuit and the waveform-shaping circuit are incorporated in a driver IC.

5. The motor control circuit as recited in claim 1, wherein the transistors are bipolar transistors.

6. The motor control circuit as recited in claim 1, wherein the waveform-shaping circuit is operable for transforming the square wave into a trapezoidal wave.

7. A motor control circuit, comprising:
a pulse width modulation (PWM) signal generating circuit for generating a square wave with a sequence of alternating on-time and off-time;
a driving circuit having two alternately conducted drive units; and
a waveform-shaping circuit, connected to the PWM signal generating circuit and the driving circuit, wherein the waveform-shaping circuit has a plurality of waveform-shaping units respectively connected with the conducted drive units for adjusting both the rise-time and the fall-time of the square wave to be within a predetermined range of the square wave period;
wherein the driving circuit outputs a driving signal to a fan motor according to an adjusted square wave outputs from the wave form-shaping circuit;
wherein the waveform-shaping circuit includes a resistor and a capacitor, the resistor being connected to the capacitor and one of the conducted drive units, the capacitor being electrically connected with ground.

8. The motor control circuit as recited in claim 7, wherein the predetermined range is from 5% to 15% of the square wave period.

9. The motor control circuit as recited in claim 7, wherein the waveform-shaping circuit is a phase delay circuit.

10. The motor control circuit as recited in claim 7, wherein the driving circuit and the waveform-shaping circuit are incorporated in a driver IC.

11. The motor control circuit as recited in claim 7, wherein the transistors are bipolar transistors.

12. The motor control circuit as recited in claim 7, wherein the waveform-shaping circuit is operable for transforming the square wave into a trapezoidal wave.

13. A motor control circuit, comprising:
a pulse width modulation (PWM) signal generating circuit for generating a square wave with a sequence of alternating on-time and off-time;
a driving circuit having a plurality of transistors; and
a waveform-shaping circuit, connected between the PWM signal generating circuit and the driving circuit, wherein the waveform-shaping circuit has a plurality of waveform-shaping units respectively connected to the transistors for adjusting both the rise-time and the fall-time of the square wave to be within a predetermined range of the square wave period;
wherein the driving circuit outputs a driving signal to a fan motor according to the adjusted square wave;
wherein the waveform-shaping circuit includes resistors and capacitors, wherein the resistors have first ends electrically connected to the driving circuit and second ends electrically connected to the capacitors in parallel, respectively.

* * * * *